T. H. WOOD.
Carriage Top.

No. 105,287.

Patented July 12, 1870.

United States Patent Office.

THOMAS H. WOOD, OF NEW YORK, N. Y.

Letters Patent No. 105,287, dated July 12, 1870.

IMPROVEMENT IN FOLDING CARRIAGE-TOP.

The Schedule referred to in these Letters Patent and making part of the same.

*To all whom it may concern:*

Be it known that I, THOMAS H. WOOD, of the city of New York, in the county and State of New York, have invented a new and improved Folding Carriage-Top; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
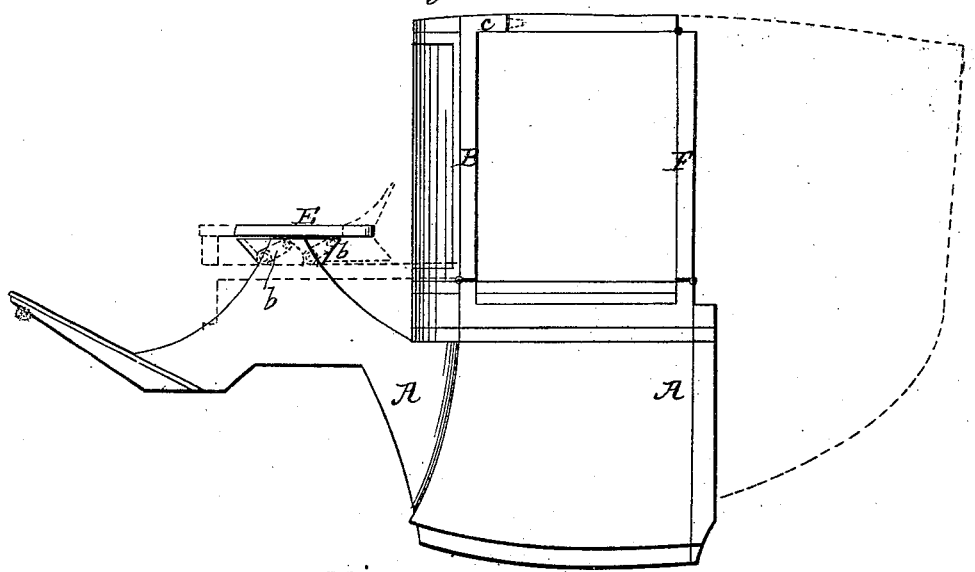
Figure 1 represents a side view, partly in section, of my improved carriage-top.

This invention relates to a new carriage-top, which is so constructed that its front part can be folded down over the driver's seat, while the front sashes are concealed in a pocket that is provided for their reception.

The object of the invention is to so construct a closed carriage that it can be converted into an open phæton without taking off or removing any parts of the cover. It can then be reclosed, whenever desired, while the carriage is under way.

A, in the drawing, represents the carriage-body.

B is the front frame of the carriage-top, hinged to the body, so that it may be swung forward, as shown by dotted lines.

The frame B, when swung up, contains sliding sashes, C C, which rest upon the grooved edge *a* of the body.

When the frame B is to be swung forward into a horizontal position, the sashes are moved to the middle and let down into a pocket, D, which is provided for their reception on the carriage-body.

Figure 2:
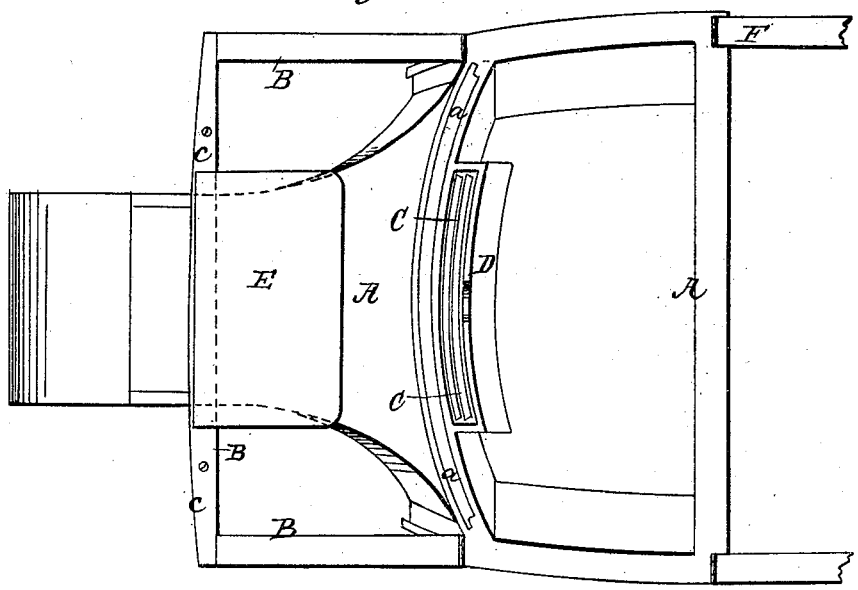
Figure 2 is a horizontal section of the same.

The frame B, when it is swung forward, embraces the driver's seat E, as shown in fig. 2, and is held down by the said seat, which is pivoted to swinging arms, *b b*, to be carried forward or backward at will.

When the frame B is again to be elevated, the seat E must be carried back, to clear the front or top bar *c* of said frame, allowing it to be raised.

The rear frame F of the carriage-top swings back in the ordinary manner.

It will be been that this top can be folded down without requiring the removal from the carriage of any parts composing the top, and that it can readily be folded open or closed, as may be desired. The carriage can, therefore, when under way, be accomodated to the state of the weather.

Having thus described my invention,

I claim as new and desire to secure by Letters Patent—

1. The hinged frame B, arranged in front of the carriage-top, to fold down over the driver's seat, substantially as herein shown and described.

2. The driver's seat E, pivoted to swinging arms *b*, so that it can be applied to lock and release the hinged frame B of the carriage-top, as set forth.

THOMAS H. WOOD.

Witnesses:
  GEO. W. MABEE,
  ALEX. F. ROBERTS.